United States Patent [19]
Dicus

[11] 3,828,360
[45] Aug. 6, 1974

[54] COMBINATION CAMERA AND DEVELOPER TANK

[75] Inventor: Allen B. Dicus, River Forest, Ill.

[73] Assignee: DKL Industries, Inc., Chicago, Ill.

[22] Filed: May 10, 1973

[21] Appl. No.: 359,189

[52] U.S. Cl. .................................. 354/89, 354/331
[51] Int. Cl. ............................................ G03b 17/50
[58] Field of Search........ 95/11 R, 13, 14, 16, 89 R, 95/90, 95, 96, 97, 99

[56] References Cited
UNITED STATES PATENTS

| | | | |
|---|---|---|---|
| 427,778 | 5/1890 | Mailloux | 95/11 R |
| 549,504 | 11/1895 | Dumke | 95/16 |
| 638,103 | 11/1899 | Edgecomb | 95/11 R |
| 734,693 | 7/1903 | Fraley | 95/99 |
| 779,956 | 1/1905 | Mills | 95/16 |
| 2,232,763 | 2/1941 | Becher | 95/90.5 |
| 2,526,840 | 10/1950 | Bass | 95/13 |
| 2,578,498 | 12/1951 | Bass | 95/96 X |
| 3,650,194 | 3/1972 | Ib | 95/11 R X |

*Primary Examiner*—Fred L. Braun
*Attorney, Agent, or Firm*—Dressler, Goldsmith, Clement & Gordon, Ltd.

[57] ABSTRACT

A combination camera and developer tank formed by a pair of separate light tight sections allows film sheets to be exposed and developed therein without the addition of further apparatus. A film sheet is held in the camera by flexing it against a concave surface in the rear section of the camera. The front section of the camera contains an aperture and rotatable shutter which aligns a pin-hole defined therein with the aperture to expose the film. Processing solutions are introduced into the camera through a light tight liquid passage which directs the solutions to the film surface. The camera is formed with a convex rear exterior to provide a rocking surface for distributing the solutions across the surface of the film sheet.

10 Claims, 6 Drawing Figures

PATENTED AUG 6 1974 3,828,360
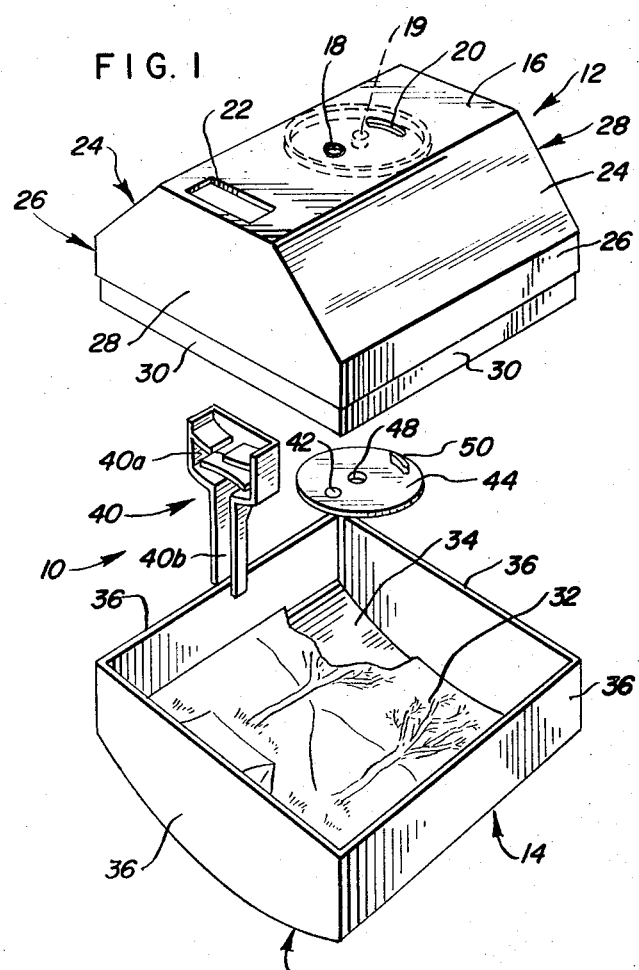
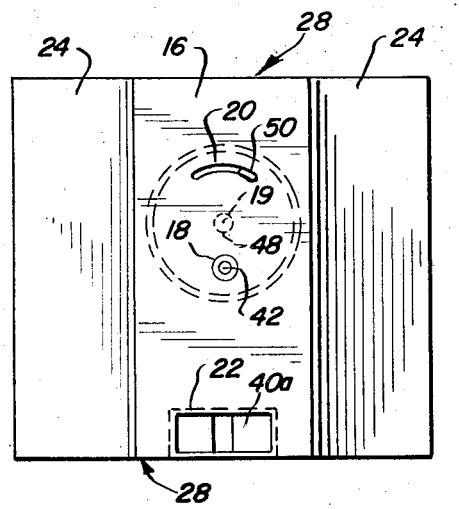
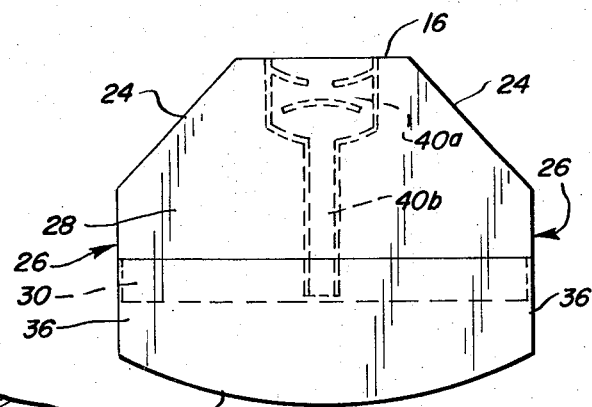
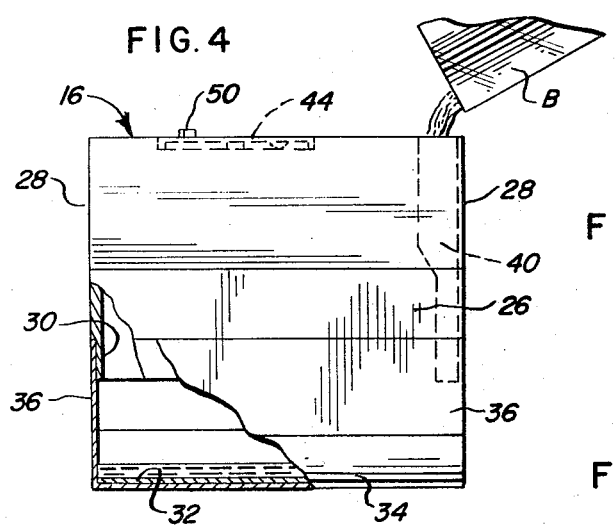
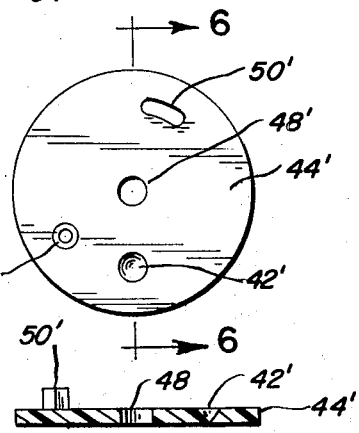

COMBINATION CAMERA AND DEVELOPER TANK

BACKGROUND OF THE INVENTION

Photography has, within recent years, become increasingly important as a leisure activity. The introduction of portable compact cameras, high-speed film emulsions and improved printing paper has made photography one of the most rapidly growing industries. One area of particular interest is cameras designed for use by children or youthful photographers. The educational experience which may be gained by youngsters in photographing, developing and printing pictures which they have taken is understandably quite valuable.

Obviously, any camera designed for use by children must be of a simple and rugged construction to withstand handling and curiosity of these youthful users. Various self-developing cameras have been proposed by the toy industry for use by children, however, these cameras have not received wide-spread commercial acceptance primarily due to their rather sophisticated and complex structures. Many of these prior art cameras have embodied a variety of attachments such as film holders, film transport mechanisms, attachable developing tanks, and sophisticated optical systems. These structures not only make the cameras expensive, but also detract from their use by the young photographer and consequently, do not give the educational experience which could be obtained from photography.

SUMMARY OF THE INVENTION

The present invention is an inexpensive camera device which is particularly adaptable for use in educational and experimental applications. This invention utilizes a simplified two piece structure to form the camera housing and developing tank so that the youthful photographer may take pictures and develop film without the use of a dark room.

In the disclosed embodiment, two separable open sections form the body of the camera and developing tank. The front section or lid has a planar front wall which defines an aperture and port, and side walls which extend from the front wall to form a generally rectangular shaped section at their free ends, and a flange by which the two sections are interconnected to form the light tight housing. A shutter in the form of a rotatable disc, having at least one pin-hole to focus the image on the film plane is operatively mounted on the front wall and may be selectively rotated to expose film. A light tight liquid passage is provided in the lid and directs developing solutions to the surface of the film.

The rear section or base is formed with a back wall having a concave shaped interior and convex exterior and side walls extending forwardly from the back wall to form a generally rectangular shaped chamber which is adapted to hold the developing solutions introduced into the camera. The concave surface and side walls cooperate to retain a film sheet against the back wall. The film sheet is slightly wider than the rear section so that it is forced to flex against the rear wall and is frictionally held against the rear wall by its edge contact with the side walls. Additionally, the concave back wall provides a curvilinear focal plane which increases the size of the picture area.

Prior to use of the camera, the sections of the housing are separated and a film sheet is placed in the camera while in a darkened area, e.g., a closet. The two housing sections are assembled to provide a light tight structure, and the camera is ready for use. The film is then exposed by rotating the shutter to align the pin-hole with the aperture in the front wall. After exposure, the shutter is closed and the film sheet may be developed.

The housing is placed on its convex base so that a light tight liquid port in the lid is facing upwardly. A developer solution is then poured through the light tight port and onto the film, and the camera is rocked on its curved base to evenly distribute the developer across the surface of the film sheet. A fixer solution is poured through the camera port at the appropriate time, and the rocking motion repeated. When the film sheet is fully developed, the camera may be opened.

After the lid and base have been separated, the base, with the film sheet positioned therein, is placed beneath a tap, and the film sheet and base are washed with running water, after which the film sheet is removed from the base and allowed to dry.

Due to the size of the film sheet that is used in the present invention, positive pictures may be made from the film sheet without the requirement of enlarging devices since acceptable full size contact prints may be made from the dried film sheet.

Numerous other advantages and features of the present invention will become readily apparent from the following detailed description of the invention and of one embodiment thereof, from the claims and from the accompanying drawings in which each and every detail shown is fully and completely disclosed as a part of this specification, in which like numerals refer to like parts.

BRIEF DESCRIPTION OF THE SEVERAL VIEWS OF THE DRAWINGS

For a more complete understanding of the invention, reference is made to the accompanying drawings in which:

FIG. 1 is an exploded view of a camera embodying the present invention;

FIG. 2 is a front elevation view of the illustrated camera;

FIG. 3 is a bottom plan view of the illustrated camera;

FIG. 4 is a side elevation view, partially in cross section, of the illustrated camera;

FIG. 5 is an alternative shutter that may be used in the present invention; and

FIG. 6 is a cross sectional view of the shutter of FIG. 5 taken along the line 6—6.

DETAILED DESCRIPTION OF THE PREFERRED EMBODIMENT

While this invention is susceptible of embodiment in many different forms, there is shown in the drawings and will herein be described in detail, a preferred embodiment of the invention and a modification thereof, with the understanding that the present disclosure is to be considered as an exemplification of the principles of the invention and is not intended to limit the invention to the embodiment illustrated. The scope of the invention will be pointed out in the appended claims.

The camera 10 is comprised of a pair of separable open sections, a lid or front section 12, and a base or rear section 14, which are interconnectable to form a light tight housing or container. The lid 12 includes a planar front portion or wall 16 defining an aperture 18, a curvilinear shutter access slot 20, and a liquid port 22, and diverging walls 24 extending outwardly from the sides of the front portion. The side walls 26 extend rearwardly from the ends of the diverging walls 24 and side walls 28 extend rearwardly from the front wall at the top and bottom of the front section and join with the diverging walls 24 and side walls 26 to form a generally truncated V shaped section (FIG. 3). The free edges of the side walls 26 and 28 form a rectangular shape and are provided with peripheral flanges 30 to frictionally engage the side walls of the rear section 14, FIG. 4.

The rear section 14 is used to hold the film sheet 32 and forms the main portion of the developer tank. As may be seen in FIG. 1, the rear or back wall 34 is curvilinear to provide a concave interior surface and a convex exterior surface. The side walls 36 extend forwardly from the rear wall 34 to form a liquid tight pan-like structure which functions to confine the developing solutions.

The film sheet 32 used in the camera 10 is normally loaded in a darkened area and is of the type generally available in the market place. The rear section 14 is formed so that its width (when viewing FIG. 2) is slightly less than the standard film sheet 32, so that the film sheet is bowed slightly as it is pressed into place against the curved back wall 34. The film sheet 32 is thus held against the rear wall 34 (FIG. 1) by its natural flexure and its frictional engagement with the side walls 36. It should also be noted that the curved back wall 34 provides for a slightly larger picture area than would be possible if the back was flat.

A light tight liquid passage is formed by flow member 40 which permits the introduction of developing solutions into the camera 10. Flow member 40, which is in fluid communication with the liquid port 22, is open along one side and is attached to the interior of the lid 12 along the bottom side wall 28 to form a closed passage. Flow member 40 includes a labyrinth type flow portion 40a disposed adjacently to the port 22 which blocks the passage of light to the interior of the camera 10 and an elongated fluid channel 40b. As best illustrated in FIG. 3, the flow member 40 extends rearwardly from the front wall 16 to about the end of the flange 30. The elongated channel 40b allows solutions, which pass therethrough, to be deposited close to the film sheet with minimum splattering of the solution. It will be appreciated that such undesired splattering could cause spotting of the film during developing process.

Since this camera is of primary utility as an educational instrument, there are certain design criteria which should be met, namely, simplicity of operation and durability of the components. To these ends, the exposure means used in the preferred embodiment is a pin-hole. A pin-hole provides not only a rugged exposure component, but also one which provides universal focus of all objects within its region of light acceptance. Moreover, the pin-hole requires prolonged exposure times due to the small amount of light it admits, and the time it takes that light to expose the film. These prolonged times allow children some overall flexibility in the use of this camera, since they need not make elaborate calculations for exact exposure time.

Exposure is provided by a pin-hole 42 in a disc shutter 44 which is rotatably mounted on the inner surface of the front wall 16 by mounting stud 19 formed on the inside of the front wall 16. Stud 19 is positioned in the shutter mounting hole 48 so that the shutter 44 may be rotated thereon. The shutter 44 is provided with an operating projection 50 which passes through access slot 20 so that the shutter may be operated from the exterior of the camera.

Aperture 18 is located at the same radial distance from stud 19 as the pin-hole 42 is from the mounting hole 48 so that, as the shutter 44 rotates about the stud, the pin-hole may be aligned with the aperture to expose the film. The projection 50 and pin-hole 42 are on different diameters so that when the lever is at one extreme position in the access slot 20 (FIG. 2), the pin-hole and aperture 18 are aligned and, when the lever is moved from this position, the shutter is closed.

After the camera 10 has been loaded with a film sheet 32, the lid 12 is placed on the base 14 and both parts are pressed together to form a light tight seal between the flanges 30 and the side walls 36. Before the camera 10 is removed from the darkened loading area, the shutter 44 is closed and the camera is ready for use.

Since this camera 10 generally takes time exposures, i.e., exposures requiring exposure times in excess of one second, the camera should be placed on a sturdy object pointing towards the object to be photographed. After the camera 10 is in such a position, the shutter 44 is opened and the film sheet 32 is exposed for the necessary exposure time, after which the shutter 44 is closed. The camera 10 is now ready to act as a developer tank for the exposed film sheet 32.

When ready to develop the film sheet 32, the camera 10 is placed on the convex surface of the rear wall 34 (FIG. 4), and a suitable developer solution is poured from beaker B through port 22 and flow member 40 and on to film sheet. The camera 10 is gently rocked on the curved portion of the rear wall 34 to evenly distribute and circulate the developer over the surface of the film sheet. After the film sheet 32 is developed, a fixer solution is similarly introduced into the camera. The camera 10 is again rocked on the curved surface for the necessary time and development is complete. The time necessary for the developer and fixer to react is well known in the art and varies depending upon the type of film and solutions used.

After processing, the lid 12 is removed. Without removing the film sheet 32 from the base 14, water is allowed to thoroughly wash the film sheet and base. The film sheet 32 may then be removed and allowed to dry. Since the film sheet is of a large size, in one embodiment 4 × 5 inches, it may be used in with sun light and positive printing paper to reproduce contact prints.

The shutter 44, FIG. 1, contains a single pin-hole 42, however, it is sometimes desirable to have more flexibility in exposure, particularly when the object to be photographed is not well lighted. To this end, a second shutter 44' is shown in FIG. 6 which has a second opening 43 which is larger than the pin-hole 42' to decrease the necessary exposure time. The other components of shutter 44' are the same as those in shutter 44 and are correspondingly numbered with primed numbers.

It will also be appreciated that more sophisticated shutter and lens may be used without departing from the scope of this invention. However, the pin-hole is preferred due to its rugged design particularly when the camera is used by children.

From the foregoing, it will be observed that numerous variations and modifications may be effected without departing from the true spirit and scope of the novel concept of the invention. It is, of course, intended to cover by the appended claims all such modifications as fall within the scope of the claims.

I claim:

1. A combination camera and developer tank comprising: a light tight housing defined by a pair of separable open sections, said housing including a first open section having a continuous curvilinear back wall and integral sidewall means extending forwardly from the periphery of said back wall to define a chamber adapted to receive and retain a film sheet against said back wall and to hold developing solutions deposited therein, and a second open section having a front portion defining an aperture and port, and sidewall means extending rearwardly from the periphery of said front portion; means for frictionally interconnecting the free ends of said first and second sections sidewall means; shutter means operative with said aperture to expose film, and light tight liquid passage means in fluid communication with said port, the exit of the passage being disposed adjacent to said back wall, whereby solutions may be poured therethrough to process said film without the use of the dark room.

2. The combination camera and developer tank as set forth in claim 1 wherein the inner surface of said back wall is concave.

3. The combination camera and developer tank as set forth in claim 1 wherein said cuvilinear back wall defines a convex exterior surface, whereby said housing may be rocked thereon.

4. The combination camera and developer tank as set forth in claim 1 wherein said interconnecting means includes an integral flange extending from the free ends of the second section side wall means.

5. A combination camera and developer tank as set forth in claim 1 wherein said shutter means includes a rotatable member having a pin-hole alignable with said aperture upon rotation of said member for exposing the film.

6. A combination camera and developer tank as set forth in claim 1 wherein said shutter means is comprised of a rotatable member having a plurality of different sized holes therein adapted to be selectively aligned with said aperture to expose said film sheet.

7. A combination camera and developer tank as set forth in claim 5 wherein said shutter means is operatively supported on said front wall and accessable therethrough for rotation.

8. A combination camera and developer tank as set forth in claim 1 wherein said light tight liquid passage means includes a labyrinth liquid passage in direct communication with said port and a liquid directing channel integral with the downstream end of said labyrinth passage and extending therefrom to direct liquid to the film sheet positioned against said back wall.

9. A combination camera and developer tank as set forth in claim 1 wherein said first section side walls are planar to define a rectangularly shaped chamber and said second section side walls include diverging wall means extending from the peripheral sides of said front portion and planar side wall means extending rearwardly from the periphery of said diverging wall means and the top and bottom of said front portion, thereby to define a rectangular shaped open section at the free ends of said side wall means.

10. A combination camera and developer tank comprising: a light tight housing defined by a pair of separable open sections, said housing including a first open section having a continuous curvilinear back wall defining a concave interior surface and a convex exterior surface, and integral sidewall means extending forwardly from the periphery of said back wall to define a rectangular shaped chamber, said chamber being adapted to receive and retain a film sheet against said concave surface and hold developing solutions deposited therein, and a second open section having a planar front wall of less width than said back wall, an aperture, an access slot, and a port formed in said front wall, diverging planar walls extending from the peripheral sides of said front wall and planar sidewall means extending rearwardly from the pheriphery of said diverging walls and the top and bottom of said front wall, thereby defining a rectangular shaped section adjacent the free edges of said sidewalls, said free ends having an integral flange extending therefrom to frictionally engage the free ends of said first section sidewall means; a disc defining an opening to expose film; means for rotatably mounting said disc on said front wall and in coplanar relationship therewith; said disc having a portion accessible through said access slot to allow said disc to be rotated and align said opening with said aperture; and a light tight liquid passage means in fluid communication with said port and extending to a point adjacent to said back wall whereby solutions introduced through said port pass through said passage onto film retained against said back wall.

* * * * *